(No Model.) 2 Sheets—Sheet 1.
H. DE GROUSILLIERS.
STEREOSCOPIC TELEMETER.
No. 583,703. Patented June 1, 1897.
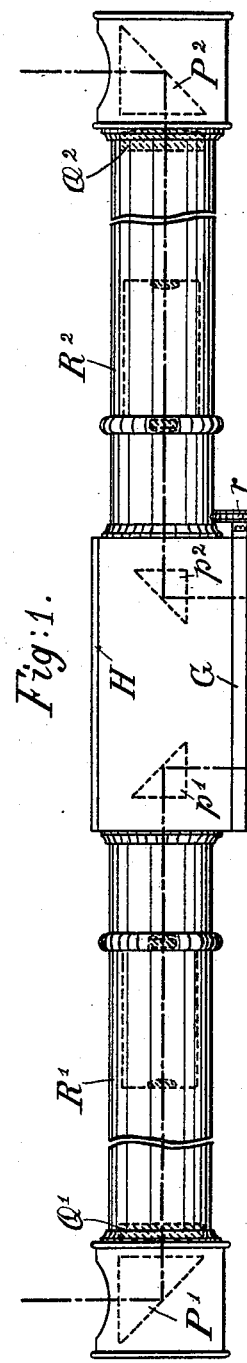
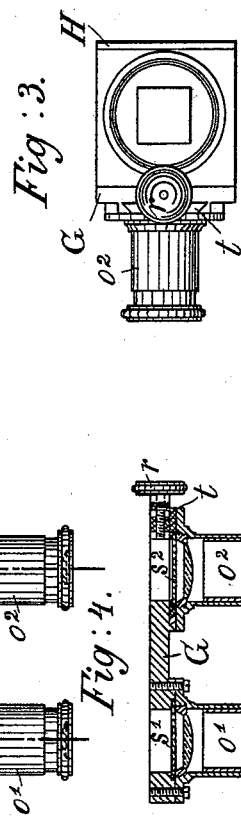
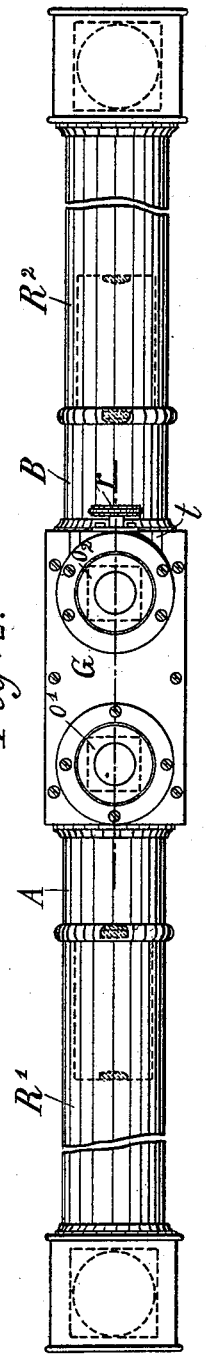
Witnesses:
Thomas M. Smith
Richard C. Maxwell
Inventor.
Hector de Grousilliers,
By J. Walter Douglass.
Attorney.

(No Model.) 2 Sheets—Sheet 2.
H. DE GROUSILLIERS.
STEREOSCOPIC TELEMETER.

No. 583,703. Patented June 1, 1897.

*Fig. 5.*

*Fig. 6.*

Witnesses:
Thomas M. Smith.
Richard C. Maxwell.

Inventor:
Hector de Grousilliers,
By J. Walter Douglass.
Attorney.

UNITED STATES PATENT OFFICE.

HECTOR DE GROUSILLIERS, OF BERLIN, GERMANY.

STEREOSCOPIC TELEMETER.

SPECIFICATION forming part of Letters Patent No. 583,703, dated June 1, 1897.

Application filed January 31, 1894. Serial No. 498,683. (No model.)

*To all whom it may concern:*

Be it known that I, HECTOR DE GROUSILLIERS, a subject of the Emperor of Germany, residing at Berlin, (Charlottenburg,) in the Empire of Germany, have invented a certain new and useful Improved Stereoscopic Telemeter, of which the following is a full, clear, and exact specification.

In viewing a landscape through a binocle or double telescope the observer has an immediate perception of the relative depth or the more or less distant situation of the objects standing one behind the other, and this is owing to the fact that the real images produced by the object-glasses of the two telescopes in their focal planes are not quite identical, but present parallactic differences in the location of corresponding points of the images within the focal planes. If A, B, C, to N be objects situated at different distances from the observer and appearing nearly in the same direction—*i. e.*, in close proximity to each other in the optical fields of the two telescopes, say at the points $A'$, $B'$, to $N'$ of one field and at the points $A^2$, $B^2$, to $N^2$ of the other field—the linear distances $A'$ $B'$, $A'$ $C'$, to $A'$ $N'$ in the one field of view will differ from the linear distances of the corresponding pairs of points $A^2$ $B^2$, $A^2$ $C^2$, to $A^2$ $N^2$ in the other field of view in proportion to the distance existing between the centers of projection of the two images, or, in other words, the distance between the two object-glasses.

The extent of these parallactic differences may generally be determined according to well-known rules in the following manner:

Assuming $A'$ $A^2$ to be the points at which in both fields of view an infinitely-distant object A is depicted and $N'$ $N^2$ to be the points at which is depicted an object N situated at a finite distance E from the observer, the difference between the linear distances $A^2$ $N^2$ and $A'$ $N'$—*i. e.*, the parallactic differences between the image of the one object situated at an infinite distance and the other object placed at the finite distance E—will be $$A^2 N^2 - A' N' = d = \frac{\triangle}{E} f,$$

$f$ being the equivalent focal length of the telescope lenses and $\triangle$ the distance between their respective axes.

In the case of two objects N and $N'$, both of which are located at finite distances E $E'$ from the observer, the parallactic difference in the two images will consequently be $$N^2 N^{2'} - N^{1'} N^{11} = \left(\frac{1}{E'} - \frac{1}{E}\right) \triangle \cdot f.$$

The quantity $\triangle$ in the case of an ordinary double telescope is determined by the distance of the eyes of the observer. Where, however, the object-glasses of the double telescope are separated from each other farther than usual by means of mirrors or reflecting-prisms—in accordance with the principle on which the construction of the telestereoscope is based—$\triangle$ may be made to represent any desired multiple of such distance of the eyes.

In a terrestial telescope, so far as the real images are concerned which appear before the eyepieces proper of the instrument, $f$ should denote the equivalent focal length of the entire optical systems by which those images are produced—*i. e.*, the focal length of the object-lenses—combined with the intermediate image-inverting lenses. The said parallactic differences between the real images produced by the two object-glasses are independent of the particular part of the field of view in which the objects to be compared may appear, as well as of the lateral distance existing between such objects. These differences are made visible on an enlarged scale to the eyes of the observer through the eyepieces of the telescopes, acting as magnifying-glasses, and in viewing a landscape with various objects situated at unequal distances from the instrument the observer is enabled to perceive those differences as differences of depth within the stereoscopic picture resulting from the combination of the two images of the landscape in binocular vision. Now exactly the same principle will apply to the production of a stereoscopic picture of artificial objects of unequal depth by binocular vision.

Let a transparent glass plate be placed within the ocular fields of each telescope and a series of marks (dots, lines, or the like) made on each plate in a direction parallel to the junction-line of the axes of the two telescopes. We will call the marks in one field of view $a'$, $b'$, to $n'$, and the marks in the other field $a^2$, $b^2$, to $n^2$. The lineary distances $a'$ $b'$, $a'\,c'$, to $a'\,n'$ between the marks of one ocular plate may be arbitrarily chosen. As to the distances between the corresponding marks of the other plate $a^2\,b^2$, $a^2\,c^2$, to $a^2\,n^2$, we will suppose them to be so proportional that the differences $a^2\,b^2 - a'\,b'$, $a^2\,c^2 - a'\,c'$, to $a^2\,n^2 - a'\,n'$ are equal, respectively, to the following quantities:

$$\frac{\triangle}{e\,b}\cdot f, \frac{\triangle}{e\,c}\cdot f, \text{ to } \frac{\triangle}{e\,n}\cdot f,$$

$\triangle$ being, as before, the distance between the two object-glasses of the double telescope and $f$ the focal length of the picture-producing set of lenses. Let, furthermore, the position of the plates in the two fields be so adjusted that if the picture of an object situated at a very long (infinite) distance be projected in one field at the point or mark $a'$ it coincides at the same time with the mark $a^2$ in the other field. The two groups of marks $a'$, $b'$, $c'$, to $n'$, $a^2$, $b^2$, $c^2$, to $n^2$, will then form correct stereographs of a group of artificial objects $a$, $b$, $c$, to $n$, which (no matter how combined or arranged) are situated at the distances $\infty\,e\,b$, $e\,c$, to $e\,n$ from the spot occupied by the observer, and uniting the two fields in binocular vision through the two oculars a stereoscopic picture of the said objects $a$, $b$, $c$, to $n$ must appear to the observer. The distances $e\,b$, $e\,c$, to $e\,n$ from the observer at which the said objects appear are given by the equation $$e\,n = \frac{\triangle \cdot f}{a^2\,n^2 - a'\,n'}$$

and are therefore known, provided that the respective values of the differences $a^2\,b^2 - a'\,b'$, $a^2\,c^2 - a'\,c'$ which the groups of marks are supposed to present are known also.

Supposing that a landscape is viewed through the double telescope, which comprises natural or real objects A, B, to N, situated at unknown distances EA, EB, to EN, there will be projected into the image of this landscape the image of the group of artificial objects $a$, $b$, to $n$, situated at known distances, and therefore by comparing the positions of the former in the different planes of the panorama to the positions of the latter the unknown distances at which the real objects A, B, to N are situated from the observer may readily be estimated by means of the known distances at which the artificial objects $a$, $b$, to $n$ are located.

Upon the principle above set forth is based a novel method of estimating distances, which essentially differs from any of the methods heretofore adopted in this particular, that it utilizes the direct immediate perception of the depth dimension in stereoscopic vision.

The improved method may be carried out in practice in two different ways, which, though identical in principle, involve the employment of different means of measurement.

One arrangement may be carried out by placing groups of marks, such as above referred to, within the two fields of view in the shape of scales, the lines of which represent exact stereographs of a series of objects extending on either a straight or curved line at irregular or regular distances, say at one hundred meters from line to line. Owing to the binocular combination of the images of these scales, there will therefore be projected into the image of the landscape viewed the image of a series of optical distance-marks extending downward on a more or less steep incline, the distance of each mark from the observer being immediately ascertainable by the numbers with which the scales are provided. To determine, therefore, the distance of a given object in the landscape viewed, it is only necessary so to turn or direct the telescope as to bring the object sighted near to the stereoscopic image of the distance-scale. Taking, then, any fractions of the degrees of the scale duly into account, the position or depth of the object may be ascertained by observing the point of the scale with which it coincides or which (on the telescope being slightly turned in the horizontal plane) it appears to intersect.

Scales representing correct stereographs of such series of distance-marks in regular succession or gradation may be produced in accordance with the formulæ given above either by photography or by engraving series of lines with a diamond on glass plates by means of suitable dividing mechanism.

In the other form of apparatus the marks introduced into the field of view of the double telescope may be so arranged that when viewed stereoscopically instead of (as in the arrangement just described) showing a number of objects situated at different distances simultaneously and in juxtaposition they present to the view the image of one object only, which appears to move in succession to different points, each situated at a different though predetermined distance. If only one mark be brought into each ocular field—say a diamond-cut line in a transparent-glass plate or simply a thread—and if arrangements be made to enable the mark of one field to be shifted by means of a screw or other adjusting mechanism in a uniform manner and to a measurable extent along the line of junction of the axes of the two eyepieces, while the mark of the other field retains its position unaltered near the center of such field, the gradual displacement of the movable mark and the binocular junction of the two images will present to the view an object appearing uniformly to move nearer to or farther away from the observer.

In one position of the mark or thread the stereoscopic image will appear to be situated at an infinite distance—namely, when an infinitely-distant real object while it is projected by the object-glass of one telescope to the stationary mark or thread is at the same time made exactly to coincide with the movable mark or thread by the other object-glass. Supposing now that the latter mark or thread is moved from this position (which we take to be the zero position) a certain length $d$, the apparent distance $e$ from the observer at which the artificial object will be perceived stereoscopically may be worked out by the following equations:

$$d = \frac{\triangle \cdot f}{e} \text{ or } e = \frac{\triangle \cdot f}{d},$$

and given the values of $\triangle$ and $f$ and the extent of displacement $d$ of the mark being known, the distance $e$ may easily be determined. The unknown distance E of a natural object in a landscape viewed through the binocle is next determined by finding the position of the movable mark (displaced to the extent $d$) at which the artificial object, stereoscopically viewed, appears in the image or panorama to be situated at the same distance (or depth) as the real object. This second way of distance measurement, according to the improved method, may further be modified as follows: Instead of displacing the mark or thread within one ocular field the marks are allowed to remain stationary in both fields, while the real image of the external objects is micrometrically displaced within the field of one eyepiece in relation to the stationary mark of that field, just as it would be displaced if the axis of one telescope were to turn so as to alter its direction in relation to the axis of the other telescope. In this case the stereoscopic object viewed through the binocle will appear at a certain distance from the observer. The displacement of the image of the landscape viewed in the one ocular field will cause the mark sighted at the same time apparently to advance toward or recede from the observer, and on being so displaced to a certain extent it will appear to lie at the same distance as any observed point of the stereoscopic landscape. Now if the displacement of the movable image is measured from that position as the zero-point, in which an infinitely-distant external object is seen at the same depth as the stereoscopic mark, the finite distance E of an object will be found from the equation $$E = \frac{\triangle \cdot f}{d},$$

the extent of displacement $d$ from the zero position being that which is necessary to bring the object sighted to the same depth as the stereoscopic mark.

The required displacement of the picture of the landscape in the one field of view may be effected to a measurable extent by any change of position of the parts of one of the telescopes, which is equivalent to an inclination imparted to the axis of that telescope in relation to the axis of the other telescope within the plane in which both axes are situated. This is feasible, for example, by a micrometric displacement of the object-glass at right angles to its axis, or in the case of telestereoscopic instruments by micrometrically turning one of the reflecting-prisms, deflecting the axis of the telescope at ninety degrees, or by any other method of micrometric measurement used in connection with distance-measuring devices.

It will therefore be understood that the process herein described may be carried out also by means of some of the arrangements hitherto used for estimating distances, provided their construction is such that objects are observed through them by means of two telescopes, and that the distances of any such object may be determined by the micrometrical measurement of its parallactic angle corresponding to the base-line formed by the object-glasses of the two telescopes. All telemeters of this description may be made applicable to the stereoscopic method of observation described above. Where two telescopes are available, it is only necessary to use them both conjointly as a binocle instead of, as hitherto usual, each individually.

The characteristic feature of the last-mentioned arrangement, as well as of that which comprises the stereoscopic scale of depths or the movable distance-mark, is that the measurement is based upon the immediate stereoscopic perception of difference of depth in a given image or panorama, so that no sighting, properly speaking, of the object of which it is desired to determine the distance is necessary, it being sufficient to bring the stereoscopic mark as close to the object viewed as may be favorable to ascertain the equality or otherwise of its distance or depth.

In the accompanying drawings a stereoscopic telemeter is shown by way of example and as an illustration of the foregoing observations, it being arranged with eyepieces which are adjustable by hand or otherwise.

Figure 1 is a plan view thereof. Fig. 2 is a front view partly in broken section. Fig. 3 is an end view of the instrument and a side elevational view of the eyepieces. Fig. 4 is a horizontal section on the line A B of Fig. 2 through the eyepieces and their supporting-plate. Fig. 5 is a greatly-enlarged view of the scale on the right ocular, and Fig. 6 is a similar view of the scale on the left ocular, of the instrument.

In its optical arrangement the instrument is not unlike a telestereoscope, consisting of two ordinary terrestrial telescopes, the distance between the apertures of immergence of the object-lenses being about seventy centimeters. The two tubes $R'$ and $R^2$, carrying the objectives $Q'$ and $Q^2$, and the reflecting-prisms $P'$ and $P^2$, located in front of such objectives, are connected in the form of the instrument shown by a casing G H. Within this casing are secured the prismatic reflectors $p'$ $p^2$, while the front wall G of the casing carries the eyepieces or oculars $o'$ and $o^2$. In the front wall or plate G, as illustrated in the sectional view in Fig. 4, are fitted glass plates $s'$ and $s^2$, provided with the stereoscopic scales illustrated in Figs. 5 and 6 and such as have been hereinbefore fully described.

The glass plate $s'$, situated in front of the eyepiece $o'$, is stationary in the metal plate G, while the other glass plate $s^2$ is carried by a slide or carriage $t$, adjustable within small limits in its slideway by means of a screw $r$, so that one scale may at any time be properly adjusted in relation to the other.

The tubes $R'$ and $R^2$ are so regulated as regards their length that the images of distant objects projected by the object-glasses of the telescopes fall exactly in the planes of the scales. The scales of Figs. 5 and 6 are enlarged forty times the natural size. The lower scale in each figure when of natural size represents distances from four hundred and fifty to one thousand meters, and the upper scales when of natural size represent distances of from one thousand to ten thousand meters. The observer is, however, in a position by adjusting the eye-lenses to regulate the scale in such a manner that in binocular sighting he may perceive at the same time both the stereoscopic image of a series of distance-marks projected into the image of the landscape, which marks will correspond to the stereographs upon the plates $s'$ and $s^2$. The crosses (+) provided between the upper and lower series of marks on the scales serve as a means for adjusting the scales, so that the scales will have no reference whatever to the proper measurement of the object viewed.

Having thus described the nature and objects of my invention, what I claim as new, and desire to secure by Letters Patent, is—

A stereoscopic telemeter having a scale placed to receive the images of the object viewed, whereby the position of the images relatively to the scale will indicate the distance of the said object, substantially as and for the purposes described.

In witness whereof I have hereunto signed my name in the presence of two subscribing witnesses.

HECTOR DE GROUSILLIERS.

Witnesses:
ARTHUR BAERMANN,
GUSTAV TAUER.